Feb. 21, 1967 R. C. BURROUGHS ETAL 3,304,666
CONVERTIBLE FURNITURE WALL
Filed Oct. 25, 1962 6 Sheets-Sheet 2

INVENTORS
ROBERT C. BURROUGHS
NORMAN C. BURROUGHS

Feb. 21, 1967   R. C. BURROUGHS ETAL   3,304,666
CONVERTIBLE FURNITURE WALL
Filed Oct. 25, 1962   6 Sheets-Sheet 3

INVENTORS
ROBERT C. BURROUGHS
NORMAN C. BURROUGHS

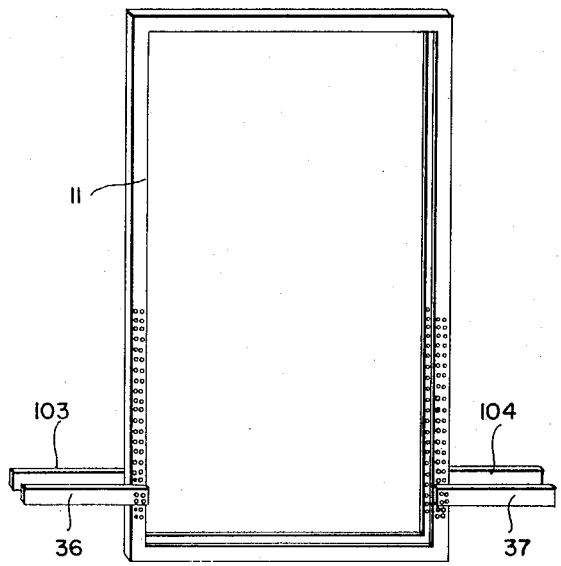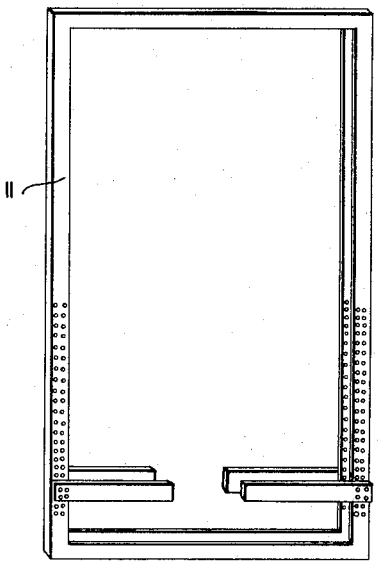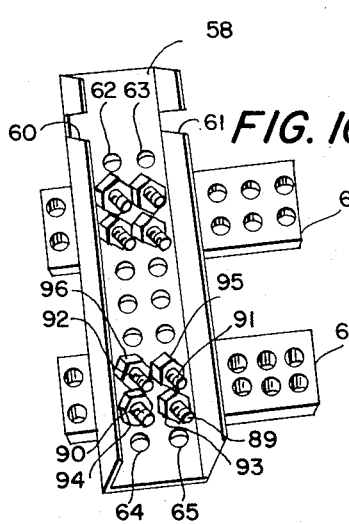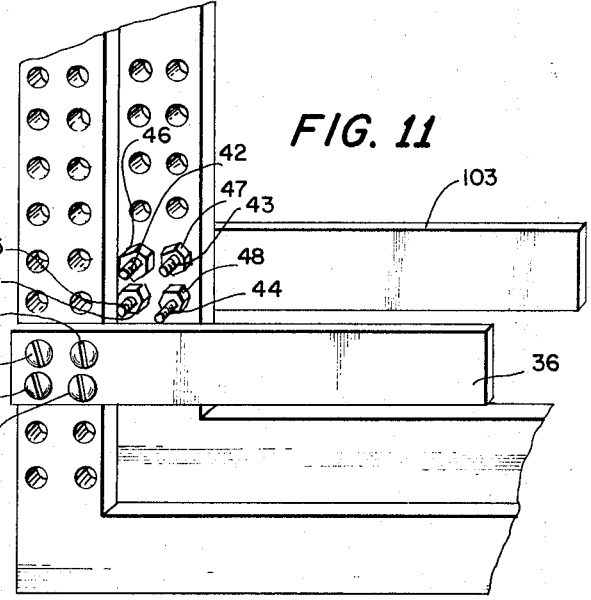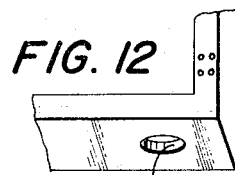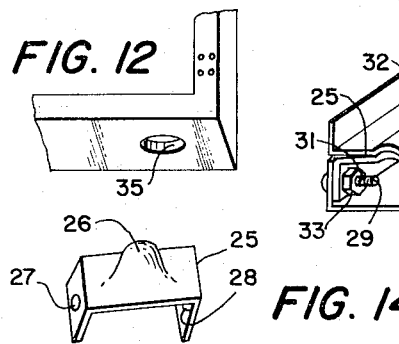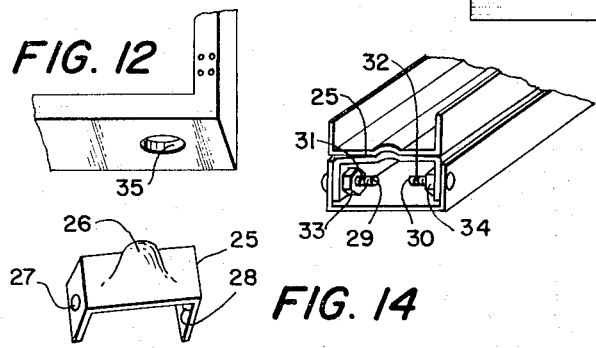

Feb. 21, 1967  R. C. BURROUGHS ETAL  3,304,666
CONVERTIBLE FURNITURE WALL
Filed Oct. 25, 1962  6 Sheets-Sheet 5

INVENTORS
ROBERT C. BURROUGHS
NORMAN C. BURROUGHS

Feb. 21, 1967 R. C. BURROUGHS ETAL 3,304,666
CONVERTIBLE FURNITURE WALL
Filed Oct. 25, 1962 6 Sheets-Sheet 6

INVENTORS
ROBERT C. BURROUGHS
NORMAN C. BURROUGHS

United States Patent Office 3,304,666
Patented Feb. 21, 1967

3,304,666
CONVERTIBLE FURNITURE WALL
Robert C. Burroughs, 1906 Sunderland Place NW., Washington, D.C. 20036, and Norman C. Burroughs, 6905 Old Mill Road, Norfolk, Va. 23518
Filed Oct. 25, 1962, Ser. No. 233,119
2 Claims. (Cl. 52—29)

This invention relates to a convertible furniture wall incorporating a mechanical apparatus for attaching and rotating furniture in a manner to convert the type and purpose of any given room to the type and purpose of another.

The five principal parts of the invention, namely, the outer stationary wall, the inner revolving wall, the apparatus for revolving said inner wall, the apparatus to support and adjust the furniture, and the furniture itself all have an interdependent relationship between one another so that each becomes an integral part of a new and unique mechanism which converts the type and purpose of any room to another.

In order to more clearly illustrate the invention, first, it will be necessary to explain the installation of the convertible furniture wall and its component parts. The installation of said convertible furniture wall incorporates the simple basic principle for installing a window casing or door frame. As there must be a sizeable aperture in the wall to receive a window casing or door frame, so there must be a sizeable aperture in the outer wall to receive the convertible furniture wall. As the window casing and door frame have means for securing against the sides of its aperture, in a similar manner the large outer frame of the convertible furniture wall has means for securing against the sides of its aperture. Inside of said larger frame, a smaller rectangular inner frame revolves vertically on axles adjoining the two frames, said inner frame having separate pieces of furniture mounted on opposing front and rear sides. Said inner frame has securing and adjusting means to receive furniture in the form of mounting bars, support arms, and extension support arms which are mounted on the opposing front and rear sides of said frame. Said mounting bars, support arms and extension support arms enable furniture of varied widths and heights to be supported and adjusted in a uniform manner to the inner revolving frame on both opposing front and rear sides of said inner frame. The furniture is adjusted to mount above the finished floor surface to allow the furniture to rotate without touching the floor.

With the exception of the lower section of the inner frame wherein are mounted the mounting bars, support arms, and extension support arms to receive the furniture, the entire remainder of both the inner and outer frames are covered over with the existing material and color pattern of the outside wall. The small area that is not covered by the existing material and color of the outside wall will not be seen as it will be covered by the mounted furniture so that the viewer will not observe any semblance to another wall except for a very fine crack resembling a pencil line where the outside wall and the inside wall meet. The only way the revolving wall would be recognized as a revolving wall would be when the wall is turned. When the user wishes to reverse the existing piece of furniture attached to the convertible furniture wall, the wall is released by means of a spring catch and rotated on its axles 180 degrees bringing in the hidden piece of furniture which, heretofore, had been secured to the opposing side of the wall in a hidden area, and the prior existing piece of furniture now disappears into the hidden area of the opposing side of the wall, the two pieces of furniture merely reversing places or positions. The hidden area of said opposing side of the wall can become part of a closet interior or part of an irregular wall having recesses for trophies, flowers, decorations, scenery, etc., or for whatever the builder has in mind.

The mechanism and function of the convertible furniture wall can be more clearly illustrated by giving an example of one of its most practical uses, namely, the changing of a reading room into a bedroom. The typical room incorporating the convertible furniture wall will have two units or two convertible furniture walls. In a typical den or reading room the three basic pieces of furniture can be (1) a bookcase set into the first convertible furniture wall, (2) a desk set into the second convertible furniture wall, and (3) a standard type convertible sofa. In the hidden area of its opposing room, said first convertible furniture wall can have a dresser secured to its opposing rear side opposite aforementioned bookcase, and the second convertible furniture wall can have a chest of drawers secured to its opposing side opposite of aforementioned desk. When it is desired to have an extra bedroom for a visiting guest, the user releases the first convertible furniture wall by pressing against said wall which releases a spring catch, and rotates said wall 180 degrees thereby reversing the position of the bookcase and the dresser so that the bookcase turns into the hidden area of the opposing room and the dresser comes into view. In a like manner the second convertible furniture wall is rotated 180 degrees so that the desk turns into the hidden area of the opposing room and the chest of drawers comes into view. By converting the standard convertible sofa into a bed the reading room has now been converted into a bedroom.

Though one of the prime objects of the convertible furniture wall is to provide an extra bedroom for visiting guests as illustrated in the foregoing description, the scope of the invention is not meant to be considered as being restricted to this one change as the convertible furniture wall has multiple uses, depending upon what type of furniture will be used in the convertible furniture wall and depending upon existing room furniture and what type of convertible room is desired. As indicated by the appended claims, the invention embraces the use of any type of furniture desired for any type of room desired, and each piece of said furniture will embody the same principle of becoming an integral part of this unique mechanism which converts the style and purpose of the room.

A further object of the invention is to provide by means of conversion an extra room of any type deemed necessary or desirable by spending only a fraction of the building cost needed to add another room to a new house.

A further object of the invention is to utilize more space, the complete converted room being added by taking up only space needed for the hidden area of the convertible wall furniture.

A further object of the invention is to decrease heating costs necessary to heat an additional standard type room.

A further object of the invention is to eliminate an extra room to clean and upkeep, thereby minimizing the chores of a typical housewife.

A further object of the invention is to increase the value of the house.

Other objects and advantages will become apparent from a consideration of the following description and the appended claims in conjunction with the accompanying drawings wherein:

FIGURE 8 is a perspective view of the inner frame showing the mounting bars pointing to the outside for the mounting of wide furniture.

FIGURE 9 is a perspective view of the inner frame showing the mounting bars pointing to the inside for the mounting of narrow furniture.

FIGURE 10 is a perspective view showing how extension support arms mount to the support arm.

FIGURE 11 is a detail view showing how mounting bars are mounted to the inner frame.

FIGURE 12 is a detail view showing a recess in the inner frame for the purpose of receiving an engaging spring catch.

FIGURE 13 is a sectional view on the line 13—13 of FIGURE 1 detailing the engaging of the spring catch with the aforementioned recess of FIGURE 12, and detailing the securing of said spring catch to the outer frame.

FIGURE 14 is a perspective view of the spring catch.

Figure 20:
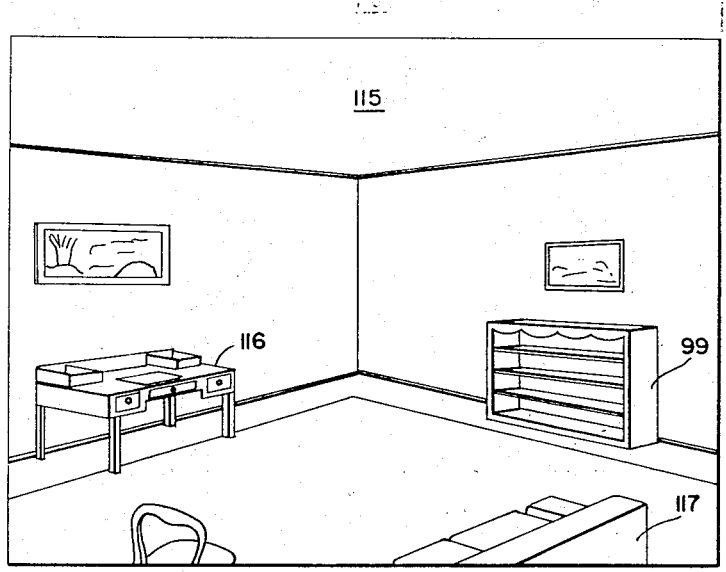
FIGURE 20 is a perspective view of a typical reading room or den having a desk and a bookcase mounted to their respective hidden convertible furniture walls and a sofa which is adapted to convert into a bed.
Figure 21:
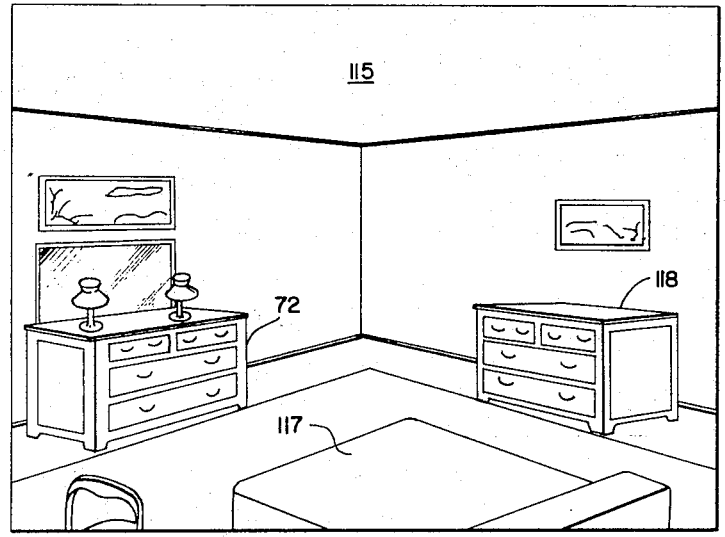

FIGURE 21 is a perspective view of the same room of FIGURE 20 after it has been converted into a bedroom. The two convertible furniture walls have been rotated and a dresser has replaced the desk and a chest of drawers has replaced the bookcase. The third piece of room furniture, namely, the sofa, has been converted into a bed.

Figure 1:
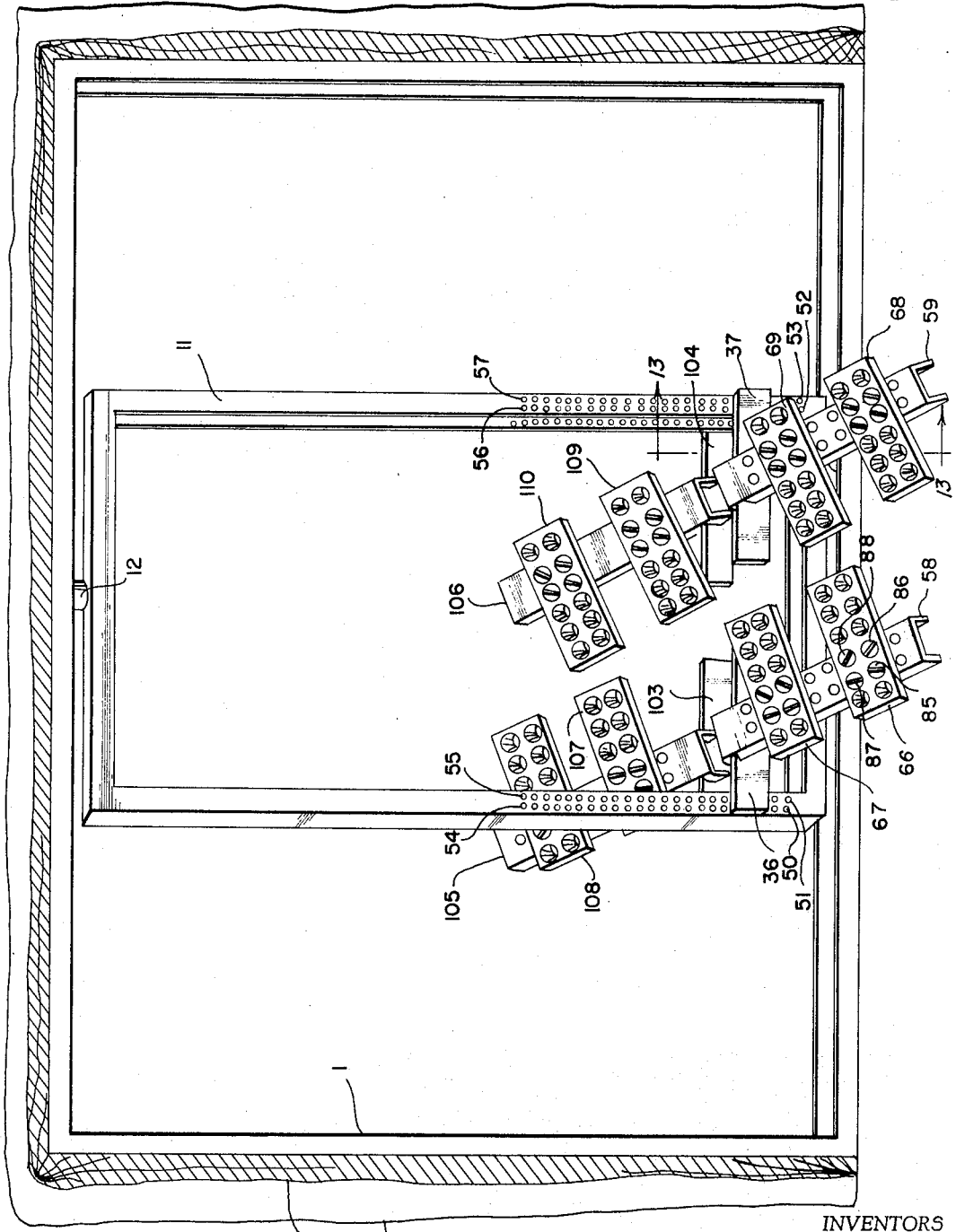
FIGURE 1 is a perspective view of the convertible furniture wall and its component parts without the mounted furniture and without the veneer inner wall covering.
Figure 15:
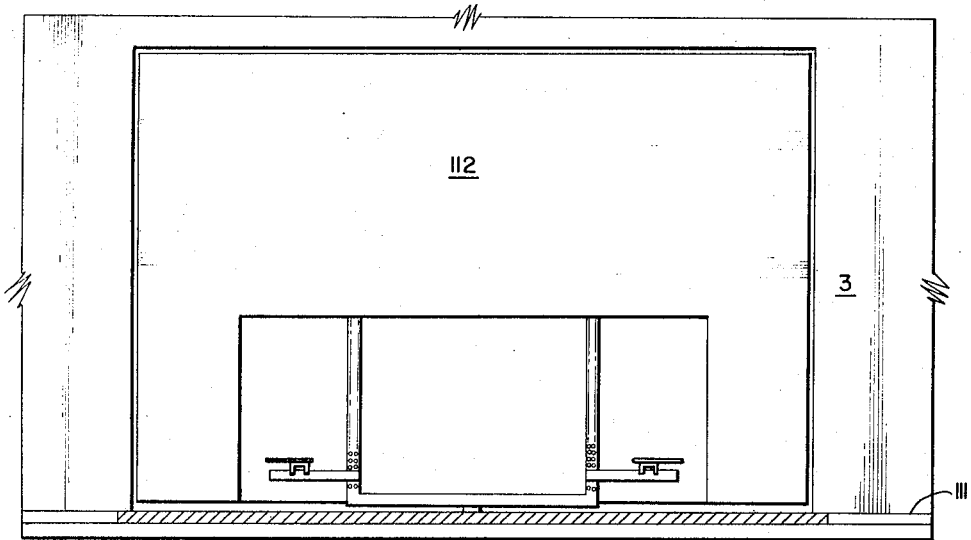
FIGURE 15 is a front elevation view showing the finished convertible furniture wall without the mounted furniture. The outer frame of said convertible furniture wall is covered by the outer wall and the area inside the outer and inner frame is partially covered by a veneer wall of the same pattern and color scheme of the outer wall.

With continued reference to the drawings, the rectangular outer frame 1 is substantially U-shaped in cross section construction and is adapted to abut against the wooden framework 2 of the outer wall 3 as illustrated in FIGURE 1. Said outer frame has its two vertically extending side members and horizontally extending top member bolted to the wooden framework as detailed in FIGURE 16, each of said members having apertures on its side faces symmetrically positioned at opposing ends medially the width of said outer frame and corresponding apertures of wooden framework to receive bolts 4 and 5 extending therethrough, said bolts having external screw threads 6 and 7 adapted to receive correspondingly threaded nuts 8 and 9 which tighten against surface area of wooden framework. The under surface area of the lower horizontally extending member of the outer frame 1 rests on the surface area of the sub flooring 10 as illustrated in FIGURE 15.

Inside the outer frame, a smaller similar rectangular inner frame 11 of substantially U-shape cross section construction of like thickness pivotally engages said outer frame as illustrated in FIGURE 1, there being apertures at the upper and lower extremities of said inner frame intermediate the length and medially the width of said inner frame to receive upper axle 12 and lower axle 13 which adjoin the two frames, said axles extending through corresponding apertures at the upper and lower extremity of said outer frame intermediate the length and medially the width of said outer frame.

Figure 17:
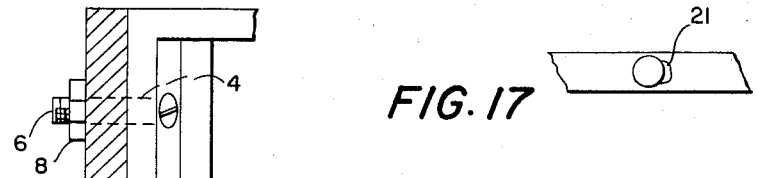
FIGURE 17 is a detail view showing how the extremities of the upper and lower axles are tack welded into their corresponding frames.
Figures 16, 18, 19:
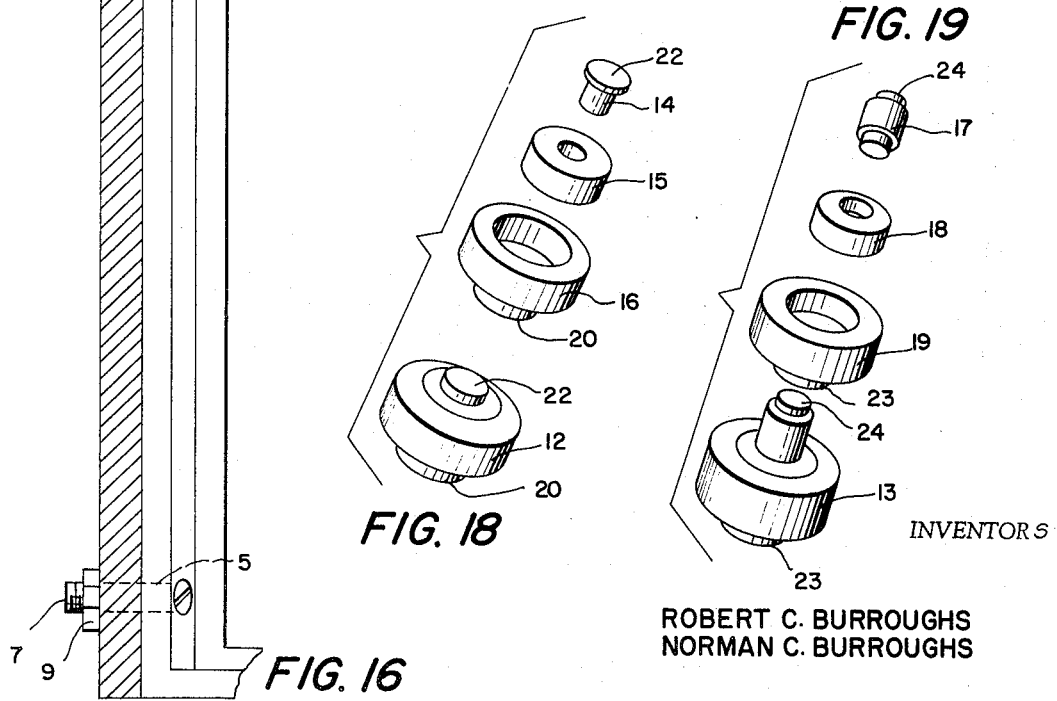
FIGURE 16 is a detail view showing how each of the two vertically extending side members and horizontally extending top member of the outer frame bolt to the wooden framework.
FIGURE 18 is a perspective view of the upper axle and a perspective view of each of its component parts.
FIGURE 19 is a perspective view of the lower axle and a perspective view of each of its component parts.

The upper axle 12 as shown in FIGURE 18 is the standard commercial radial bearing type having an axle block 14 which presses into the bearing 15, said bearing pressing into the bearing block 16. Said bearing block has a first portion 20 fitting in the aforementioned aperture of the upper extremity of the outer frame 1, there being a tack weld 21 as indicated in FIGURE 17 to keep said bearing block from turning. Said axle block has a first portion 22 fitting in the aforementioned aperture of the upper extremity of the inner frame 11, there being a tack weld 21 as indicated in FIGURE 17 to keep said axle block from turning.

The lower axle 13 as shown in FIGURE 19 is the standard commercial radial thrust bearing type having an axle block 17 which presses into the bearing 18, said bearing pressing into the bearing block 19. Said bearing block has a first portion 23 fitting in the aforementioned aperture of the lower extremity of the outer frame 1, there being a tack weld 21 as indicated in FIGURE 17 to keep said bearing block from turning. Said axle block 17 has a first portion 24 fitting in the aforementioned aperture of the lower extremity of the inner frame 11, there being a tack weld 21 as indicated in FIGURE 17 to keep said axle block from turning.

Attached to the inner surface area of the lower horizontally extending member of the outer frame is a spring catch 25 as shown in FIGURE 14, said spring catch being substantially U-shaped in construction having a raised portion 26 symmetrically positioned on its horizontally extending upper member. The two vertically extending members of said spring catch have apertures 27 and 28 symmetrically positioned on each member, there being corresponding apertures in the outer frame 1 to receive screws 29 and 30, said screws extending from the outer surface area of the outer frame through said apertures of spring catch, said screws having external screw threads 31 and 32 adapted to receive correspondingly threaded lock nuts 33 and 34 which tighten against the inner surface area of said two vertically extending members of said spring catch.

The aforementioned raised portion of said spring catch engages a proportionate recess 35 on the bottom surface area of the lower horizontally extending member of the inner frame near the right end extremity of said member and intermediate the width of said member as detailed in FIGURE 12, thereby locking the two frames in position as detailed in FIGURE 13 so that said inner frame has its members disposed substantially in the planes of the corresponding members of the outer frame. When it is necessary to release the frames from their locked position, the user applies slight hand pressure against the inner frame 11, thereby bending the spring 25 which releases the inner and outer frames from a locking position.

In order to clarify more concisely the functions and particularly the positions of the remaining parts of the convertible furniture wall, it is necessary first to explain that each individual part of the front side of the inner wall has an opposing identical part on the reverse side of said inner wall disposed substantially in the planes of the corresponding part of the front side so that the reverse side of said inner wall and its component parts is likened to a mirror image of the front side of said inner wall and its component parts, the parts of the reverse side of said inner wall performing identical functions as the parts of the front side of said inner wall.

With reference to the preceding paragraph, the parts of the front side of the inner wall and their functions are thus detailed:

A pair of mounting bars 36 and 37 of rectangular shape is mounted on the two vertically extending front faces of the inner frame as shown in FIGURE 8. As further detailed in FIGURE 11 there are four apertures in one end of each of said mounting bars and corresponding apertures symmetrically positioned on the front faces of said inner frame to receive bolts 38, 39, 40 and 41 extending therethrough. As identically indicated on the mounting bar 103 mounted on the reverse side of the inner frame, the four bolts securing each mounting bar to the inner frame will have external screw threads 42, 43, 44 and 45 adapted to receive correspondingly threaded lock nuts 46, 47, 48 and 49 which bear against the inner surface of the frame securing and positioning said mounting bars to said inner frame so that the vertically extending front face of said inner frame becomes substantially perpendicular to the horizontally extending front face of said mounting bars.

Said mounting bars can be adjustably mounted at different heights by means of additional apertures in the inner frame to receive the mounting bar bolts as shown in FIGURE 1, said additional apertures beginning at 50, 51, 52 and 53 of the two respective front faces of the inner frame and extending vertically medially the width of said front faces and symmetrically positioned apart, terminating at 54, 55, 56 and 57 of said two respective front faces.

As detailed in FIGURES 8 and 9 respectfully, said mounting bars may be positioned to point outwards from the inner frame or they may be positioned to point toward the inside, depending on the width of the mounted furniture.

For mounting wide furniture or furniture with under frames spaced a considerable distance apart, the mounting bars will be positioned to point outwards. For mounting narrow furniture, the mounting bars are merely reversed so that they point to the inside.

A pair of support arms 58 and 59 substantially U-shaped in construction are slotted at 60 and 61 as illustrated in FIGURE 10, the width of said slots corresponding to the thickness of said mounting bars 36 and 37, thereby enabling the slotted portion of said support arms to fit over the top surface area of said mounting bars as shown in FIGURE 1, said slotted portion extending vertically downwards until said mounting bars fill the slot of said support arms in a snug fit. Said support arms may fit over any portion of the horizontally extending top surface area of said mounting bars, enabling said support arms to adjust to the width of the mounted furniture.

Figure 5:
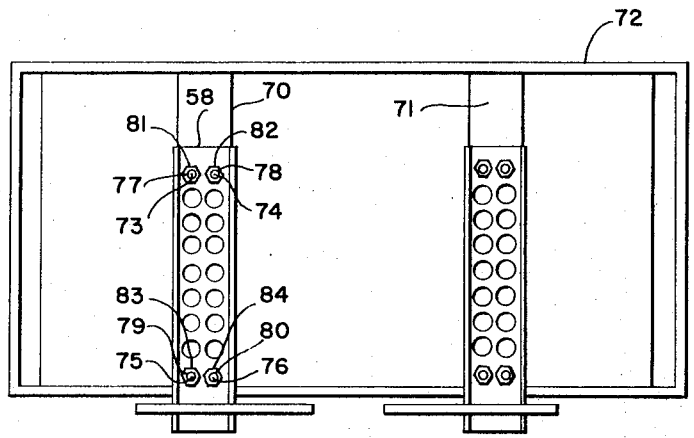
FIGURE 5 is a bottom plan view of the mounted dresser, showing how a narrow piece of furniture mounts to support arms without the need of extension support arms.
Figure 7:
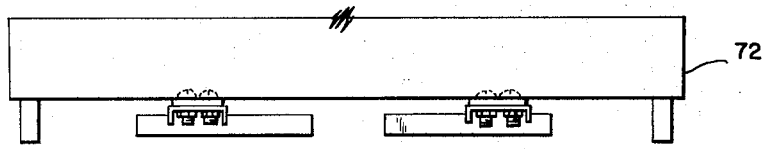
FIGURE 7 is a detail view from the front lower portion of the aforementioned mounted dresser of FIGURE 5 and showing from a different perspective how a narrow piece of furniture mounts support arms without the need of extension support arms.

A double line of symmetrically positioned apertures begins at 62 and 63 of each of said support arms as detailed in FIGURE 10 and terminate at 64 and 65 of said support arms, said apertures serving two purposes:

The first purpose is to provide apertures for mounting furniture when and if the furniture is not too wide to warrant the use of the extension support arms 66, 67, 68 and 69. When this is possible, as illustrated in FIGURE 5, there are four apertures in each of the two respective under frames 70 and 71 of the dresser 72 which align with four of the matching apertures of the double line of apertures of each of said support arms to receive bolts extending therethrough. As detailed on support arm 58 there are four bolts 73, 74, 75 and 76 extending from the inside of said dresser through the respective under frame 70 and through the support arm 58, said four bolts having external screw threads 77, 78, 79 and 80 adapted to receive correspondingly threaded lock nuts 81, 82, 83 and 84, said lock nuts tightening against the inner surface area of said support arms thereby securing said dresser to said support arms. A further illustration of this detail can also be observed from a different perspective in FIGURE 7.

The second purpose of the aforementioned double line of apertures of said support arms as illustrated in FIGURE 10 and FIGURE 1 is to provide means for mounting plate like perforated members referred to as extension support arms 66, 67, 68 and 69 when the furniture is too wide to mount without their use, said extension support arms being mounted substantially perpendicular to said support arms.

Each of said extension support arms has a double row of apertures extending substantially the entire length of its surface area, said apertures being symmetrically spaced to match corresponding apertures in said support arms so that said extension support arms can be moved to an extreme forward or reverse position and to an extreme left or right position on said support arms to provide adjustment to mount and support furniture of exceptional width. The apertures of each of said extension support arms are grouped in series of fours, thereby becoming interchangeable with apertures of each of said support arms which are similarly grouped enabling four screws to extend through apertures of each of said extension support arms and corresponding apertures of each of said support arms. As illustrated in FIGURE 1, four screws 85, 86, 87 and 88 extend through the extension support arm 66 and the support arm 58. As detailed further in FIGURE 10 each of said four screws have external screw threads 89, 90, 91 and 92 adapted to receive correspondingly threaded lock nuts 93, 94, 95 and 96, said lock nuts tightening against the inner surface area of said support arm.

Figure 4:
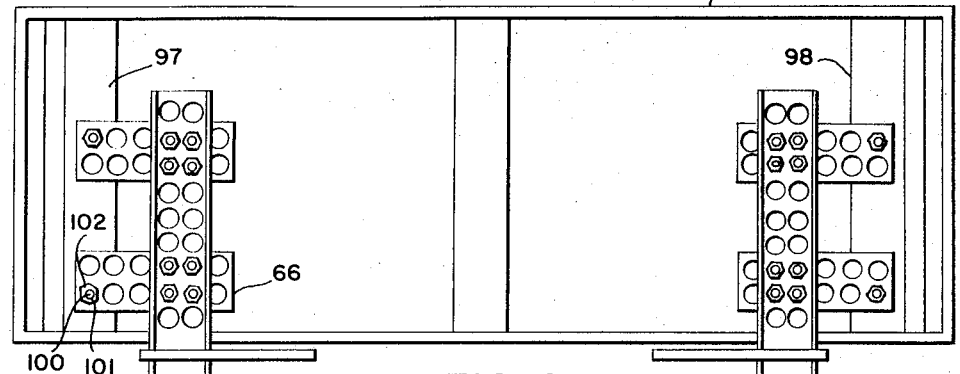
FIGURE 4 is a bottom plan view of the mounted bookcase showing how a wide piece of furniture mounts to extension support arms.
Figure 6:
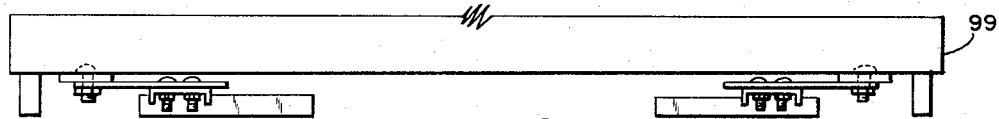
FIGURE 6 is a detail view from the front lower portion of the aforementioned mounted bookcase of FIGURE 4 and showing from a different perspective how a wide piece of furniture mounts extension support arms.

When it is necessary to use the said four extension support arms as illustrated in FIGURE 4, there are two apertures in each of the two respective under frames 97 and 98 of the bookcase 99 which may be aligned with matching apertures in each of said four extension support arms to receive bolts extending therethrough. As detailed on extension support arm 66 in FIGURE 4 the bolt 100 extends from the inside of said bookcase through said under frame 97 and through the extension support arm 66, said bolt having an external screw thread 101 adapted to receive a correspondingly threaded lock nut 102, said lock nut tightening against the bottom surface area of said extension support arm thereby securing said bookcase to said extension support arm. A further illustration of this detail can also be observed from a different perspective in FIGURE 6.

As revealed in a previous paragraph, the component parts of the reverse side of the inner wall are disposed substantially in the planes of the corresponding component parts of the front side of said inner wall, said component parts for both front and reverse sides being identical and performing identical functions. Likewise, the apertures in said component parts and the apertures in the reverse side of the inner wall frame are substantially the same.

Referring to the latter paragraph, the component parts of the reverse side of the inner wall as illustrated in FIGURE 1 consists of two mounting bars 103 and 104 mounted on the reverse side of the inner frame, two support arms 105 and 106 mounted on said mounting bars and four extension support arms 107, 108, 109 and 110 mounted on said support arms. For detailed specifications on mounting said component parts, refer to previous paragraphs explaining mounting of component parts of front side of inner wall, as parts of both front and rear sides are interchangeable and identically mounted.

As illustrated in FIGURE 15, the upper horizontally extending member of the outer frame and the two vertically extending members of said outer frame are covered on both front and reverse sides by the outside wall 3, the lower horizontally extending member of said outer frame resting on the surface area of the sub flooring 10 hidden from view, its vertically extending side member extremities becoming flush with the finished flooring 111, thereby eliminating from sight all four members of the outer frame.

With the exception of the lower section of the inner frame wherein are mounted the adjusting and mounting parts, the entire inner frame area and the area inside the outer frame on both front and reverse sides are covered over by a veneer wall 112 of the same existing material and color pattern of the outside wall. The aforementioned lower section of the inner frame which is not covered would be hidden from sight by the mounted furniture.

Figure 2:
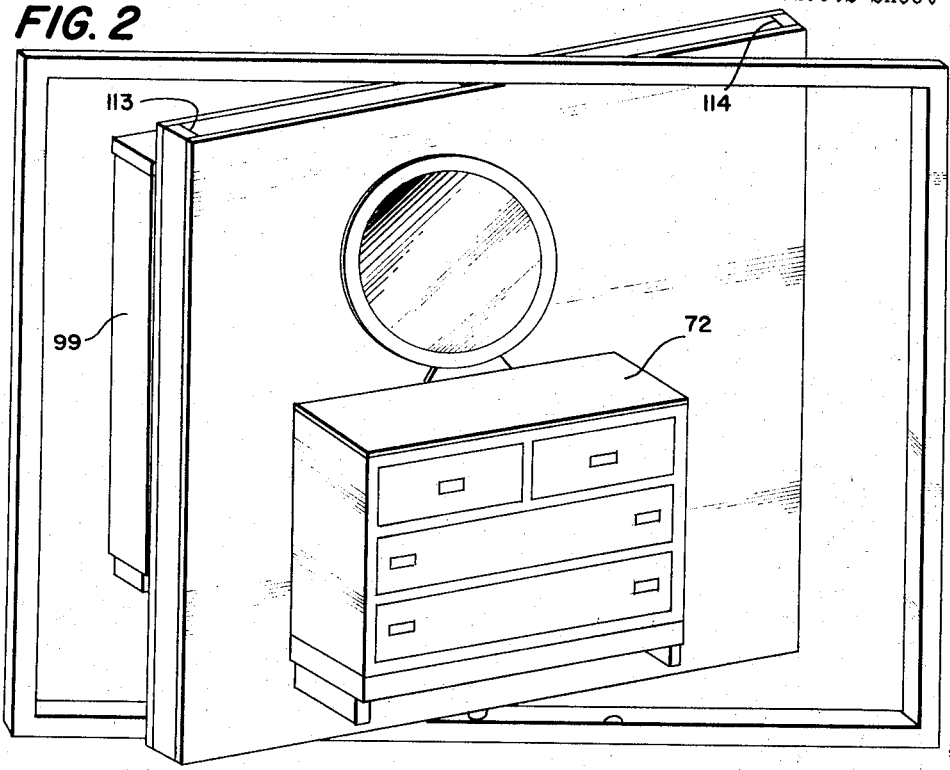
FIGURE 2 is a perspective view of the finished inner rotating wall having a dresser and bookcase mounted thereon, and pivotally engaging the outer frame.

Two vertically extending rectangular shaped wooden bars 113 and 114 as illustrated in FIGURE 2 adjoin the two veneer walls at their side extremities to stiffen said veneered wall, said wooden bars and said veneered walls being joined together by glue or epoxy.

Figure 3:
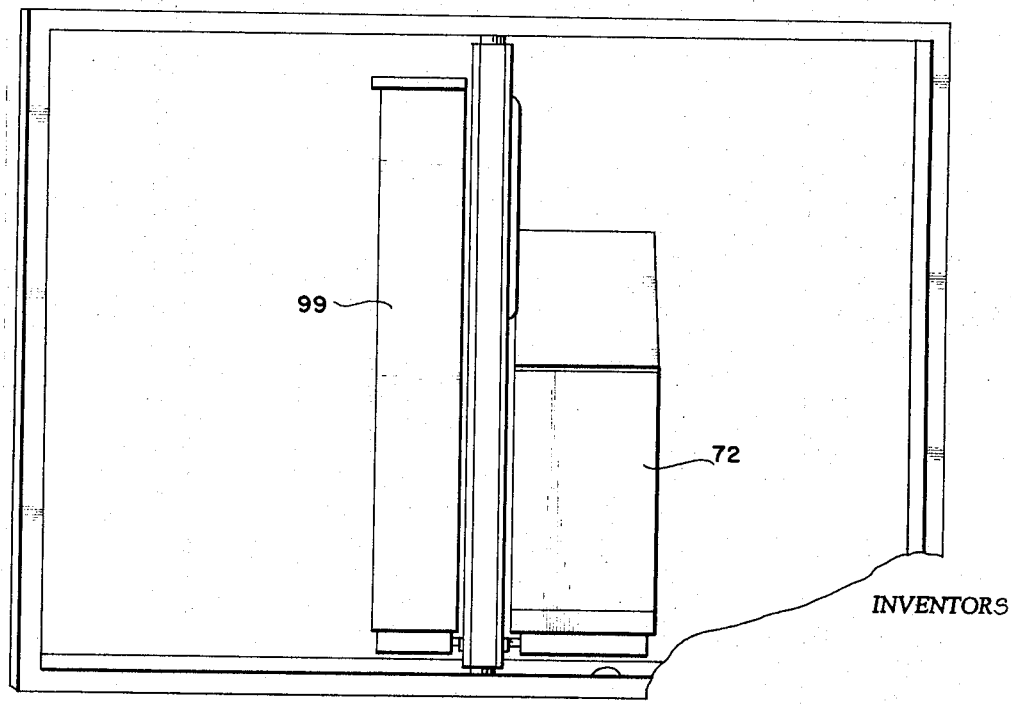
FIGURE 3 is a perspective view of the finished inner rotating wall having a dresser and bookcase mounted thereon, and pivotally engaging the outer frame at a 90 degree angle.

FIGURES 2 and 3 show a dresser 72 and a bookcase 99 mounted on the finished inner rotating furniture wall, said wall shown pivotally engaging the outer frame.

FIGURES 20 and 21 show an example of how a typical room is converted from one type to another by the use of convertible furniture walls and existing room furniture. The reading room 115 of FIGURE 20 has as its three basic pieces of furniture a desk 116 and a bookcase 99 mounted on their respective convertible furniture walls. A sofa 117 completes the 3 piece reading room set of basic furniture. FIGURE 21 shows the same reading room 115 after it has been converted into a bedroom. The two convertible furniture walls have been rotated and a dresser 72 has replaced the desk 116 and a chest of drawers 118 has replaced the bookcase 99. The sofa 117 has been converted into a bed and the conversion is now complete.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:
1. A convertible furniture wall comprising an inner movable wall pivotally mounted within an outer stationary wall, said inner movable wall having means for mounting, unmounting, replacing and adjusting articles for length, width and depth of said articles on at least one side of said inner movable wall, said adjusting means comprising at least one mounting bar vertically adjustable and secured to the inner wall, said mounting bar having at least one support arm secured thereto, said support arm having an extension thereon, said mounting bar, support arm and extension having means associated therewith for allowing adjustment of length, width and depth of furniture mounted thereon.

2. A convertible furniture wall as described in claim 1, said inner movable wall having aforementioned means on both sides of said inner movable wall.

References Cited by the Examiner

UNITED STATES PATENTS

| | | | |
|---|---|---|---|
| 892,668 | 7/1908 | Jordan | 52—65 |
| 1,174,264 | 3/1916 | Merrill | 52—65 |
| 2,022,255 | 11/1935 | Scott. | |
| 2,152,584 | 3/1939 | Cranshaw. | |
| 2,823,425 | 2/1958 | Granek | 52—65 |
| 3,044,586 | 7/1962 | Cassels. | |

OTHER REFERENCES

Republic Steel Catalog, "Bild-A-Flex"; 1958, pp. 13, 14, 18 and 19.

FRANK L. ABBOTT, *Primary Examiner.*

EARL J. WITMER, JACOB L. NACKENOFF, RICHARD COOKE, JR., *Examiners.*

R. A. STENZEL, *Assistant Examiner.*